L. L. LANGSTROTH & S. WAGNER.
APPARATUS FOR EXTRACTING HONEY FROM THE COMB.
No. 61,216. Patented Jan. 15, 1867.
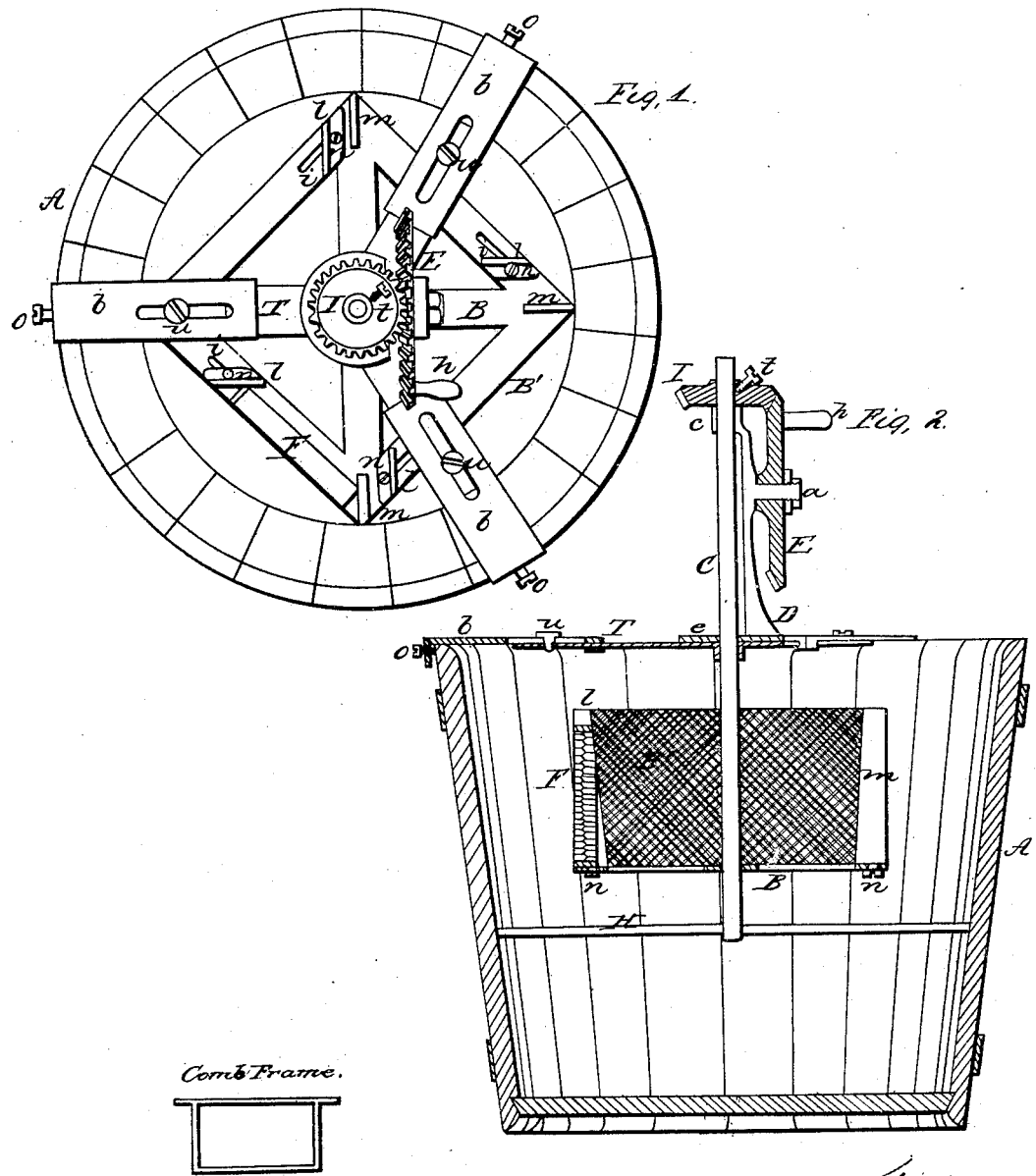

United States Patent Office.

L. L. LANGSTROTH, OF OXFORD, OHIO, AND S. WAGNER, OF WASHINGTON, DISTRICT OF COLUMBIA.

*Letters Patent No. 61,216, dated January 15, 1867.*

---

IMPROVED APPARATUS FOR EXTRACTING HONEY FROM THE COMB.

---

*The Schedule referred to in these Letters Patent and making part of the same.*

---

TO ALL WHOM IT MAY CONCERN:

Be it known that we. L. L. LANGSTROTH, of Oxford, Butler county, Ohio, and SAMUEL WAGNER, of Washington, in the District of Columbia, have invented a new and useful Machine or Apparatus for Extracting Honey from the Comb; and we do hereby declare that the following is a clear, full, and exact description thereof, reference being had to the accompanying drawings, making part of this specification, and to the letters of reference marked thereon, like letters indicating like parts wherever they occur on the drawings.

Figure 1 is a top plan view; and
Figure 2 is a transverse vertical section of the same.

Our invention has for its object the draining or extraction of honey from its comb in such a manner as not to crush or injure the latter, and thereby to preserve it for restoration to the hive to be again filled by the bees; and it consists in a suitable frame mounted in a manner to admit of its having a rapid rotary motion imparted to it, whereby the honey is extracted from the comb by means of centrifugal force. Experiment has demonstrated the fact that from fifteen to twenty pounds of honey is required to enable the bees to produce one pound of wax or comb; and that the process of elaborating the wax and building the comb is a work requiring much time. Efforts have heretofore been made to overcome this difficulty by furnishing the bees with artificial foundations for the construction of their cells; but as yet all attempts of this kind have failed to prove a success, for the reason that the skill of man has not been able to produce a foundation sufficiently thin, and which, at the same time, possessed the requisite degree of strength. Experiment has shown that the bees will not build their cells on this artificial comb foundation until it is reduced to a certain degree of thinness, and to do this requires more time than for them to build new comb. At certain seasons of the year, when the honey-producing blossoms are plenty, the bees frequently fill their combs in a very brief period, and would gather much more if they had comb in which to store it. It is to enable the bees to store this extra amount that our invention is intended; and this we accomplish by extracting the honey from the combs already filled, and restoring them to the hive to be again filled by the bees.

To do this we construct a skeleton frame, T, of any suitable size and form, having preferably three radial arms provided with adjustable extension pieces $b$, as shown in fig. 1. The outer ends of these pieces $b$ are bent downward, as shown in fig. 2, and are provided with set-screws, $o$, for securing the frame to the top of a barrel, A, or other suitable vessel, as shown; the extension pieces $b$ being added to adjust the frame to vessels of various sizes, so as to avoid the necessity of providing a vessel especially for it. To this frame T is rigidly secured an upright, D, having a box or bearing, $c$, at its upper end for the spindle C, this spindle having also another bearing at the centre of the frame T at $e$. A stud $a$ projects from the side of the upright D, on which is mounted a bevel-wheel E, which gears into a smaller bevel-wheel, I, secured to the spindle C by means of set-screw $t$. The frame T, with its upright D, may be cast in a single piece. The spindle C extends down into the tub A, and has attached to it below the frame T, another frame, B, which may be of any suitable form and size, it being in this case square. To each corner of this frame B a post or flat upright bar, $m$, is rigidly secured, as shown. A similar post, $l$, is also attached to the frame B by means of a screw, $n$, passing through a slot, $i$, in the frame B, in such a manner as to admit of the post $l$ being moved to or from the stationary post $m$, and thus increase or decrease the space between them at will, to suit different-sized comb frames. Around the outside of the frame B, and attached to the stationary posts $m$, is secured a screen of wire gauze, as represented by B'. It will be observed that the posts $m$ and $l$ are set diagonally across the bars of the frame B, so that when a frame is placed between them, as represented by F, fig. 1, they will hold the frame securely in place, and at the same time will receive frames of various thicknesses. H represents a cross-bar reaching across the vessel, and having a hole in it to receive and steady the lower end of the spindle or shaft C. The frame B is thus suspended within the tub or vessel A, from the frame T, which latter rests upon and is attached to the tub A, the spindle with its frame B being capable of having imparted to it a rapid rotary motion by means of the gear-wheels I and E.

The operation is as follows: A frame, F, containing the comb, is first taken, and the caps removed from the comb by means of a thin, sharp knife or blade attached to a suitable handle, the blade being previously dipped into hot water, or coated with oil or grease, to prevent the honey from adhering so as to crush the cells or comb. The caps being thus sliced off, the comb frame is then inserted between the posts m and l, on the frame B, the outer surface of the comb resting against the wire gauze, which thus supports it and prevents it from being torn or thrown out of the frame when it is rotated. The frame B being thus supplied with comb frames, a rapid rotary motion is imparted to the frame B and its load of honey-combs, which causes the honey to be perfectly extracted or drained therefrom on its outer face, the escaping honey which is thus thrown out by the centrifugal force being caught in the tub A. When the honey has been thus drained from one side of the comb the latter is reversed, and the honey is then extracted from the opposite side in a similar manner. After the comb has thus been emptied of its honey it is replaced in the hive, where it will be readily refilled by the bees. In order to perform the operation with success, it should be done in a room with the temperature at about eighty degrees, so as to render the honey as liquid as possible without rendering the comb too soft. By these means the comb may be drained of its honey whenever desired, and replaced in the hive entire and again filled; and thus the yield of honey from a swarm of bees may be greatly increased. By thus extracting the honey from the comb it will also be furnished in a much purer condition, free from bee-bread and the many other impurities which are necessarily mixed with it when the comb and its contents are crushed, and the honey strained from it in the usual manner. Another benefit resulting from this practice is, that the combs, by the process of slicing off the caps, will be rendered straight and of uniform thickness, thus rendering the manipulation of the frames much more easy in the hive. It is obvious that, although this method is specially adapted to the comb contained in the movable comb frames, still it may be applied to comb which is not built in the frames, as single pieces of comb of any size may be placed in the rotator, and thus emptied of their contents. In placing the comb in the machine care should be taken to place the frames on end, in such a position that the inclination of the cells will be in a direction opposite to the rotation, or else downward, as they will be more readily emptied when thus placed.

Having thus described our invention, what we claim, is—

1. The frame T, with the adjustable arms b, and the support or post D, for supporting and operating the revolving frame B, substantially as set forth.

2. The frame B, suspended by a shaft C from the frame T, and arranged to hold the comb while being rotated, substantially as herein described.

3. We claim providing the comb-holder or frame B with adjustable posts l, or their equivalents, for adjusting it to receive and hold frames or combs of various sizes.

4. In combination with the stationary posts m, and the adjustable posts l, we claim the wire gauze B', or its equivalent, arranged to support the comb, and at the same time permit the escape of the honey, substantially as described.

L. L. LANGSTROTH,
SAML. WAGNER.

Witnesses:
   JAMES T. LANGSTROTH,
   P. T. LODGE.